United States Patent [19]
Couvert et al.

[11] Patent Number: 6,087,746
[45] Date of Patent: Jul. 11, 2000

[54] ALTERNATOR WITH IMPROVED COOLING MEANS, ESPECIALLY FOR MOTOR VEHICLES

[75] Inventors: Pascal Couvert, Maisons-Alfort; Michel Pernin, Saint Germain-en-Laye, both of France

[73] Assignee: Valeo Equipements Electriques Moteur, Creteil, France

[21] Appl. No.: 09/097,951

[22] Filed: Jun. 16, 1998

[30] Foreign Application Priority Data

Jun. 19, 1997 [FR] France ................... 97 07640

[51] Int. Cl.⁷ .................. H02K 9/00; H02K 5/00
[52] U.S. Cl. ................ 310/60 R; 310/54; 310/59; 310/89
[58] Field of Search .............. 310/60 R, 60 A, 310/40.5, 43, 52, 89, 263, 62, 63, 54, 59, 61, 16, 227; 105/59; 336/59

[56] References Cited

U.S. PATENT DOCUMENTS

| | | | |
|---|---|---|---|
| 2,419,156 | 4/1947 | Packer | 171/252 |
| 2,967,959 | 1/1961 | Waters | 310/63 |
| 3,344,291 | 9/1967 | Pratt | 310/50 |
| 3,436,569 | 4/1969 | Flaherty et al. | 310/43 |
| 3,701,911 | 10/1972 | Hallerback | 310/60 |
| 3,959,677 | 5/1976 | Grieb | 310/90 |
| 4,076,989 | 2/1978 | Watson | 310/89 |
| 4,418,295 | 11/1983 | Shiga | 310/59 |
| 4,584,496 | 4/1986 | Frister | 310/60 R |
| 5,293,089 | 3/1994 | Frister | 310/54 |

FOREIGN PATENT DOCUMENTS

| | | |
|---|---|---|
| 0 104 450 | 4/1984 | European Pat. Off. . |
| 0 633 647 | 1/1995 | European Pat. Off. . |
| 34 10 760 | 9/1985 | Germany . |

OTHER PUBLICATIONS

Patent Abstracts of Japan, vol. 004, No. 087 (E–016), Jun. 1980 and JP 55 053153 A (Hitachi LTD), Apr. 1980.

French Search Report dated Mar. 20, 1998.

*Primary Examiner*—Nestor Ramirez
*Assistant Examiner*—Dang Dinh Le
*Attorney, Agent, or Firm*—Morgan & Finnegan, LLP

[57] ABSTRACT

A motor vehicle alternator has a casing carrying a stator, with a rotor of the interleaved-claw type mounted rotatably within it. Air inlet ports are provided in the casing of the machine, on one side, and air outlet ports on the opposite side, to allow cooling air to flow through the machine. The air inlet ports are situated closer to the axis of rotation of the rotor than the air outlet ports. In this way, rotation of the rotor produces a flow of air through the machine by centrifugal effect. The alternator may then be made without any ventilating fan.

13 Claims, 1 Drawing Sheet

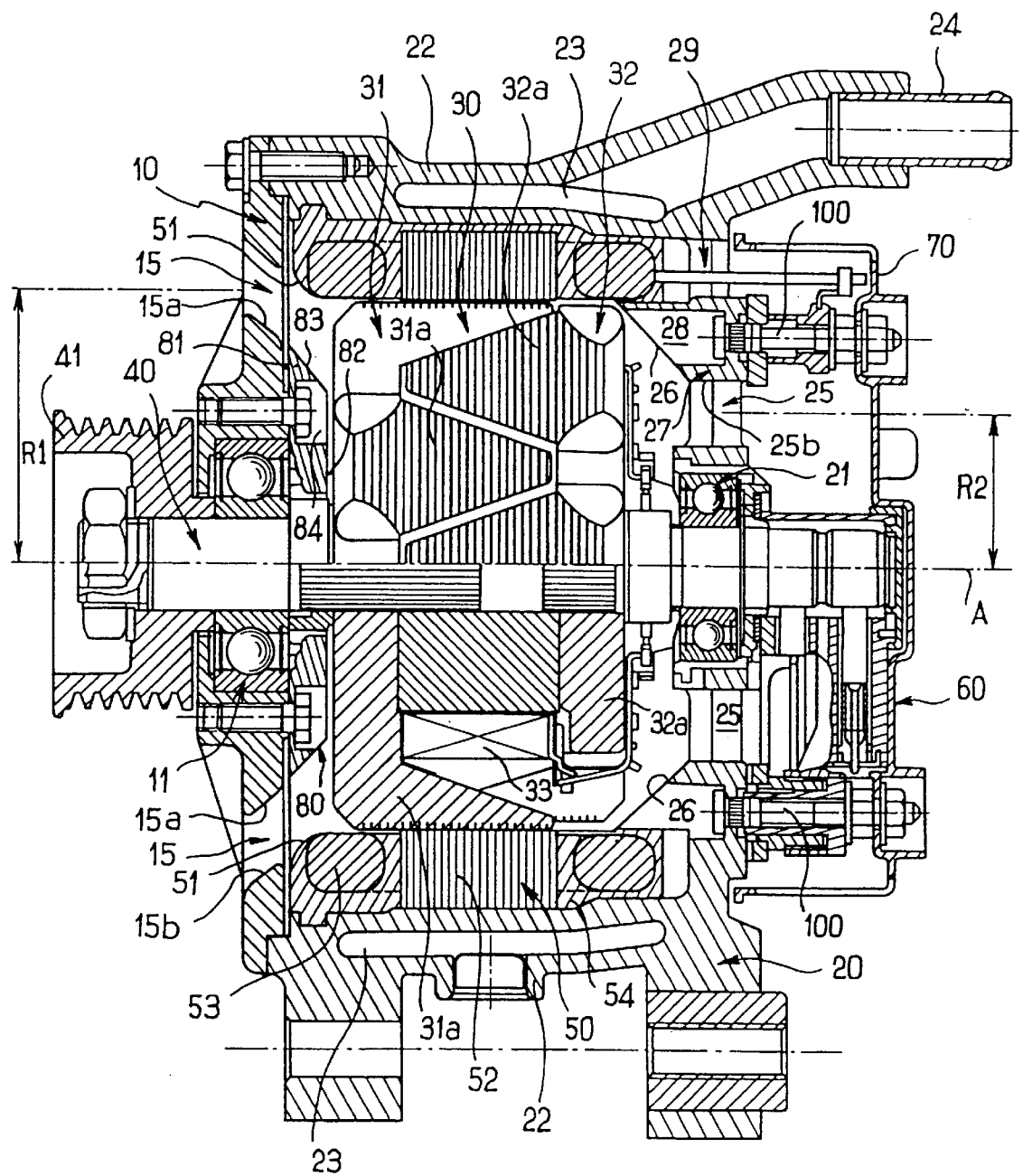

ALTERNATOR WITH IMPROVED COOLING MEANS, ESPECIALLY FOR MOTOR VEHICLES

FIELD OF THE INVENTION

The present invention relates in general terms to the cooling of motor vehicle alternators.

BACKGROUND OF THE INVENTION

Conventionally, the cooling of the various mechanical and electronic parts of an alternator (in particular the bearings, windings, regulating components and rectifiers) is achieved with the aid of one or more ventilating fans which rotate with the rotor and which cooperate with air inlet or outlet apertures formed in the two-part casing, or housing, of the alternator. These apertures, or ports, are generally formed around a front first casing component or front end plate, containing the front rotor bearing and located on the same side of the alternator as the drive pulley, and the second casing component which includes the rear end plate of the casing, containing the rear rotor bearing and located on the other side of the machine. The regulating and rectifying components are carried generally by the rear end plate.

For this purpose, many types of fans, both internal and external, axial or centrifugal, and various combinations of the latter, have been known for very many years. However, it is well known that these fans make a significant contribution to the cost and the axial size of the machine, and that they are somewhat noisy in operation.

For these reasons, attempts have in the past been made, in particular by giving a particular form of construction to the rotor, to enable the rotor itself to act as a ventilating fan by setting up a flow of air between the inlet ports and the outlet ports formed in the casing, so as thereby to obtain an alternator which is less expensive and more compact, and which is more silent in operation. This type of solution, which consists notably in giving the rotor an asymmetrical form, does however have the disadvantage that it leads to substantial increased costs in the design and manufacture of the rotor, while the ventilation effect remains somewhat limited, in spite of everything.

DISCUSSION OF THE INVENTION

The present invention aims to overcome the limitations of the state of the art such as mentioned above, and to provide an alternator in which a symmetrical rotor will by itself provide, by virtue of its rotation, satisfactory ventilation and cooling of the machine.

More precisely, the present invention is based on the realisation that, by suitable design, in particular, of the geometry of the air inlet and outlet ports, it is possible, with a conventional symmetrical rotor in which the rotor winding is wound on a rotor body of the type having interleaved claws, for the rotor to produce by itself, by virtue of its rotation, a sufficient, or at least a substantial, internal air flow.

In some embodiments, this air flow may reinforce the air flow produced by one or more ventilating fans. In other embodiments, the flow of air produced by the rotor is itself enough to ensure the necessary cooling of all of the components of the alternator, in which case the alternator need not have any other ventilating means such as a fan.

According to the invention, an alternator, especially for a motor vehicle, of the type comprising a housing carrying a stator, and in which there is mounted for rotation a rotor having interleaved claws, the casing including cooling air inlet ports on a first side, and cooling air outlet ports on the opposite side, is characterised in that the air inlet ports are situated closer to the axis of rotation of the rotor than the air outlet ports, so that flow of air by centrifugal effect is induced by rotation of the rotor.

According to a preferred feature of the invention, each air outlet port has a radially inner wall oriented obliquely with respect to the axis of rotation, each air outlet port having a downstream end at a greater radial distance from the said axis than its upstream end; and/or each air outlet port has a radially outer wall oriented obliquely with respect to the axis of rotation, each air outlet port having a downstream end at a greater radial distance from the said axis than its upstream end. Preferably, where both of these features are present, the said inner walls and outer walls of the air inlet ports have substantially the same orientation.

According to another preferred feature of the invention, the alternator further includes a first obliquely oriented wall substantially constituting an extension of the radially inner walls of the air outlet ports, the said first oblique wall extending between a wall of the alternator housing, in which the said air outlet ports are formed, and an adjacent flank of the rotor. Preferably the said first oblique wall is defined by a retaining ring for a rolling bearing arranged between a rotor shaft and the wall of the alternator housing in which the air outlet ports are formed.

According to a further preferred feature of the invention, the radially inner walls and radially outer walls of the air outlet ports are at a shorter distance and a larger distance respectively from the axis of rotation than an internal face of the stator, and the stator has a wall portion adjacent to the said air outlet ports and generally extending the radially outer walls of the air outlet ports. In preferred embodiments of this arrangement, the said wall portion of the stator consists of a rounded edge of the stator, the said rounded edge extending generally in a circle coaxial with the rotor.

Preferably, the stator is formed by moulding in plastics material over the phase windings and a carcase of the stator, and in that the said wall portion of the stator is formed by moulding.

According to yet another preferred feature of the invention, the alternator further includes a second oblique wall extending between the radially outer walls of the air inlet ports and an adjacent flank of the rotor. Preferably, the said second oblique wall is formed on a projecting element which is integral with the part of the alternator housing in which the air inlet ports are formed. Preferably also, the said projecting element obturates further air passages disposed radially outside the air inlet ports.

According to a still further preferred feature of the invention, the alternator being driven by a pulley, the air inlet ports are arranged on the opposite side of the alternator from the pulley, and the air outlet ports are arranged on the side of the alternator adjacent to the pulley.

In preferred embodiments of the invention, the air inlet ports are situated at a mean distance from the axis of rotation which is approximately equal to one half of the mean radius of the stator, and the air outlet ports are situated at a mean distance from the axis of rotation which is close to the mean radius of the stator.

In preferred arrangements, the alternator has no ventilating fan.

Further features and advantages of the invention will appear more clearly on a reading of the following detailed description of a preferred embodiment of the invention, which is given by way of non-limiting example only and with reference to the accompanying drawing.

BRIEF DESCRIPTION OF THE DRAWING

The drawing consists of a single FIGURE showing an alternator in accordance with the present invention in axial cross section.

DESCRIPTION OF A PREFERRED EMBODIMENT OF THE INVENTION

The drawing shows a motor vehicle alternator which includes, in a manner which is conventional per se: a front end plate 10; a rear end plate 20; a rotor 30 having a rotor shaft 40, which is itself mounted for rotation in the two end plates 10 and 20 by means of two rolling bearings 11 and 21; a pulley 41 which is fixed on the rotor shaft outside the front end plate 10 at the front end of the shaft 40; a stator 50 fixed to the rear end plate 20 so as to surround the rotor 30; and an assembly 60. The assembly 60 consists of brushes, together with the rectifying and regulating components of the machine, and is mounted on the outside of the rear end plate 20. The assembly 60 is protected by a hood 70.

In the present example, the alternator does not have any ventilating fan, either internally or externally, though the invention to be described below is applicable equally to machines in which ventilating fans with rotary blades remain provided.

It will be noted here that the alternator shown in the drawing is of the type having auxiliary means for cooling by liquid flow. For this purpose, the rear end plate 20, which has a cylindrical wall 22 joining the rear end plate to the front end plate 10, includes in this cylindrical wall 22 an annular passage 23 for a coolant liquid. The passage 23 is adjacent to the stator and communicates with a liquid inlet connector 24 and with a liquid outlet connector not shown. It should however be noted that in no way is the invention limited to this type of alternator with auxiliary cooling by a liquid.

The end plates 10 and 20, including the wall 22, generally constitute the casing or housing of the alternator.

The rotor 30 includes, in a manner known per se, two claw-type rotor body members 31 and 32, each including a set of claws 31a and 32a respectively, which are interleaved with each other and which enclose a rotor winding 33.

As to the stator 50, this is bonded on the internal surface of the generally cylindrical wall 22 of the rear end plate 20.

The claws 31a and 32a have on their outer faces circumferentially oriented striations, for reducing Foucault current and for reducing rises in temperature of the rotor, thereby increasing the output of the alternator.

The rear end plate 20 includes air inlet ports 25 for admitting cooling air, and the front end plate 10 has air outlet ports 15 for the cooling air. In the manner known per se, these ports are spaced apart at regular intervals in two crowns centred on the axis of rotation A. In order to ensure the flow of a stream of cooling air in the internal space of the alternator, caused mainly or solely by rotation of the rotor 30, the air inlet ports 25 lie at a mean distance R2 from the axis of rotation A. This distance R2 is shorter than the mean distance R1 between the air outlet ports 15 and the axis A. However, the inlet ports 25 and the outlet ports 15 are of substantially the same radial dimensions. In this way, centrifugal action of the rotor is exerted on the cooling air, which is thereby caused to enter through the ports closest to the axis, and to leave through the ports furthest away from the axis.

The value of the radius R2 is preferably approximately equal to one half of the mean radius of the stator, while the value of the radius R1 is close to the mean radius of the stator, being preferably approximately equal to the external radius of the rotor. In addition, it is preferable to provide a certain number of arrangements for limiting the resistance opposing the flow of cooling air, in particular by channeling the stream of air in critical regions.

The first of these arrangements consists in giving to the air outlet ports 15 an oblique orientation within the thickness of the wall of the front end plate 10. Thus, as shown in the drawing, these ports, or apertures, have internal walls 15a (in the radial direction), and external walls 15b (in the radial direction), which are obliquely oriented, that is to say they are substantially frusto-conical, with a common angle of about 45° with respect to the axis A. This facilitates the flow of air by centrifugal effect.

The edges of these walls 15a and 15b, at their transition with the inner and outer faces of the front end plate 10, are rounded, again in order to limit resistance to air flow.

A second arrangement, complementary with the first arrangement just described, consists in extending the radially inner wall 15a of the ports 15 down to a level close to the corresponding flank of the rotor 30. For this purpose, the retaining ring 80 for the front bearing 11 is used with advantage for this purpose, the configuration of the ring 80 being suitably modified.

In this connection, the retaining ring 80 has an outer face 81 for blocking the bearing 11 against axial movement in the conventional way, together with an inner face 82 which extends along, and close to, the flank of the rotor 30. The retaining ring 80 also has a frustoconical radially outer face 83, which lies essentially as an inward extension of the frusto-conical inner walls 15a of the air outlet ports 15, between the latter and the rotor 30.

Finally, the retaining ring 80 also includes a set of apertures 84 for receiving bolts for fastening it to the front bearing 10 immediately outside the rolling bearing 11 in the radial direction.

A third arrangement, which is complementary to the first and second arrangements just described, consists in adapting the form of the stator in the region where the air outlet ports extend radially close to the latter. This adaptation consists in rounding off the circular edge of the stator adjacent to the outer walls 15b of the ports 15, in such a way that there is some degree of continuity between this rounded edge and the walls 15b. Such a rounded edge is indicated in the drawing by the reference numeral 51. This is a particularly easy feature to provide where, as in the present example, the stator is formed by encapsulation, that is to say by moulding a plastics material 54 over the carcase 52 and the phase windings 53 of the stator.

It can be of advantage to provide a further arrangement in which, at the level of the air inlet ports 25, means are provided for facilitating flow of the air towards its entry into the internal cavity of the alternator. These means consist here of a frusto-conical wall 26 which extends between the cylindrical outer walls 25b of the air inlet ports 25 and the stator. This frusto-conical wall 26 meets the stator in substantially the same plane as the rear flank, or end face, of the rotor, as shown in the drawing. The wall 26 is preferably a terminal wall of a projecting element 27 formed on the rear end plate 20, so that the number of components is not unnecessarily increased.

It will be noted here that the frusto-conical wall 26 is generally solid, except in a limited number of locations (through which the plane of cross section in the drawing happens to pass), in which apertures 28 are formed, for receiving screw fasteners 100. The fasteners 100 secure the rectifier circuit and the hood 70 of the alternator in position.

It will be understood that the frusto-conical wall 26 has the effect of preventing the formation of vortices or eddies of air, or cavitation, all of which are detrimental to proper cooling, in the quiet zone which would otherwise be defined in the annular corner region defined by the stator 50 and the radial wall of the rear end plate 20.

In the configuration shown in the drawing, the projecting element 27 also obturates some further air passages 29 which lie radially outside the air inlet ports 25. These air passages 29 are arranged, in particular, for the passage through them of electrical connections from the stator to the rectifier. These passages would however otherwise serve as additional air inlets, and would therefore attenuate the mass flow of air induced by the above mentioned centrifugal action.

In view of the foregoing, it will be seen that the invention provides an alternator without any ventilating fans, in which effective ventilation is instead provided solely by the action of the rotor.

It will be noted here that the rotor can of course be adapted so as to reinforce the flow of air, by suitable adjustment of the form of the gaps between adjacent claws of the rotor.

The invention is of course in no way limited to the embodiment described above and shown in the drawing: a person skilled in this technical field will be able to apply to it any variation or modification that conforms with the spirit of the invention.

What is claimed is:

1. An alternator comprising:
    a hollow housing;
    a stator carried by the hollow housing; and
    a rotor in the hollow housing rotatably carried by the hollow housing and for rotation in the hollow housing and within the stator about an axis of rotation, the hollow housing defining a first side and a second side opposed to said first side, the hollow housing further defining cooling air inlet ports on its first side and cooling air outlet ports on its second side, wherein the air outlet ports have radially inner walls oriented obliquely to the axis, each said inner wall having an upstream end and a downstream end which is further from the axis in a radial direction than the upstream end, and wherein the air inlet ports are closer to said axis than the air outlet ports, whereby rotation of the rotor induces flow of air from said inlet ports to said outlet ports by centrifugal effect, and wherein the hollow housing includes an end wall in which said air outlet ports are formed, the rotor having a flank adjacent to said end wall, and the alternator further including a member defining a first oblique wall extending between said end wall of the hollow housing and said flank of the rotor, substantially in alignment with said inner walls of the air outlet ports.

2. An alternator according to claim 1, wherein the air outlet ports have radially outer walls oriented obliquely to said axis, each said outer wall having an upstream end and a downstream end which is further from said axis in a radial direction than the upstream end.

3. An alternator according to claim 1, wherein the air outlet ports have radially outer walls oriented obliquely to said axis, each said outer wall having an upstream end and a downstream end which is further from said axis in a radial direction than the upstream end, said inner and outer walls of each outlet port having substantially the same orientation.

4. An alternator according to claim 1, wherein the rotor has a rotor shaft, the means mounting the rotor in the hollow housing including a rolling bearing mounting the rotor shaft in said end wall of the hollow housing in which the air outlet ports are formed, the alternator further including a retaining ring between said end wall and the rotor, for retaining said bearing in the end wall, said retaining ring being the member defining said first oblique wall.

5. An alternator according to claim 1, wherein the stator has a radially inwardly directed internal face, said inner walls of the air outlet ports being at a shorter radial distance from said axis than the internal face of the stator, said outer walls of the air outlet ports being further away radially from said axis than the internal face of the stator, and the stator defining a wall portion adjacent to the air outlet ports, said stator wall portion generally constituting an extension of said outer walls of the air outlet ports.

6. An alternator according to claim 5, wherein the internal wall of the stator terminates on said first side of the alternator in said wall portion defining a generally circular edge, said edges being rounded.

7. An alternator according to claim 5, wherein the stator comprises phase windings and a carcase, together with a body of plastics material moulded over the phase windings of the carcase and defining said moulded wall portion.

8. An alternator according to claim 1, further including a coaxial pulley coupled to the rotor for driving the rotor, the pulley being on said second side of the alternator.

9. An alternator according to claim 1, wherein the air inlet ports are situated at a mean radial distance from the axis of rotation which is approximately equal to one half of a mean radius of the stator, the air outlet ports being situated at a mean radial distance from the axis of rotation close to the mean radius of the stator.

10. An alternator comprising:
    a hollow housing;
    a stator carried by the hollow housing;
    a rotor in the hollow housing rotatable carried by the hollow housing and for rotation in the hollow housing and within the stator about an axis of rotation, the hollow housing defining a first side and a second side opposed to said first side, the hollow housing further defining cooling air inlet ports on its first side and cooling air outlet ports on its second side, wherein the air outlet ports have radially inner walls oriented obliquely to the axis, each said inner wall having an upstream end and a downstream end which is further from the axis in a radial direction than the upstream end, and wherein the air inlet ports are closer to said axis than the air outlet ports, whereby rotation of the rotor induces flow of air from said inlet ports to said outlet ports by centrifugal effect, wherein the hollow housing defines radially outer walls of said air inlet ports, the rotor having a flank adjacent to the air inlet ports; and
    a member defining a second oblique wall which extends between said outer walls of the air inlet ports and said adjacent flank of the rotor.

11. An alternator according to claim 10, wherein the hollow housing includes a part in which the air inlet ports are formed, said part being the member defining the second oblique wall and including an integral projecting element defining said second oblique wall.

12. An alternator according to claim 11, further including in the hollow housing further air passages radially outside the air inlet ports, said projecting element obturating said further air passages.

13. An alternator comprising:

- a hollow housing including an annular passage for a coolant liquid;
- a stator carried by the hollow housing; and
- a rotor in the hollow housing rotatably carried by the hollow housing and for rotation in the hollow housing and within the stator about an axis of rotation, the hollow housing defining a first side and a second side opposed to said first side, the hollow housing further defining cooling air inlet ports on its first side and cooling air outlet ports on its second side, wherein the air outlet ports have radially inner walls oriented obliquely to the axis, each said inner wall having an upstream end and a downstream end which is further from the axis in a radial direction than the upstream end, and wherein the air inlet ports are closer to said axis than the air outlet ports, whereby rotation of the rotor induces flow of air from said inlet ports to said outlet ports by centrifugal effect, from which any ventilating fan is absent.

* * * * *